US008451336B2

(12) United States Patent
Fukumoto et al.

(10) Patent No.: US 8,451,336 B2
(45) Date of Patent: May 28, 2013

(54) IMAGE SENSING APPARATUS AND IMAGE SENSING METHOD

(75) Inventors: Shimpei Fukumoto, Osaka (JP); Haruo Hatanaka, Osaka (JP); Haruhiko Murata, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 393 days.

(21) Appl. No.: 12/689,642

(22) Filed: Jan. 19, 2010

(65) Prior Publication Data

US 2010/0182441 A1    Jul. 22, 2010

(30) Foreign Application Priority Data

Jan. 19, 2009 (JP) .................................. 2009-009125

(51) Int. Cl.
*H04N 5/228* (2006.01)
(52) U.S. Cl.
USPC ................................. 348/208.16; 348/208.99
(58) Field of Classification Search
USPC .................................................... 348/208.16
See application file for complete search history.

(56) References Cited

U.S. PATENT DOCUMENTS

| 5,053,875 | A | * | 10/1991 | Ishii et al. ................ 348/208.99 |
| 5,420,635 | A | * | 5/1995 | Konishi et al. ................ 348/362 |
| 2006/0072018 | A1 | | 4/2006 | Inaba et al. |
| 2006/0140602 | A1 | | 6/2006 | Kurata et al. |
| 2008/0094482 | A1 | | 4/2008 | Yoshimura |
| 2008/0094498 | A1 | * | 4/2008 | Mori ............................. 348/352 |
| 2009/0190013 | A1 | | 7/2009 | Hiraga et al. |
| 2009/0213231 | A1 | | 8/2009 | Kurokawa |
| 2010/0079606 | A1 | * | 4/2010 | Batur ......................... 348/208.6 |

FOREIGN PATENT DOCUMENTS

| JP | 2001358999 | | 12/2001 |
| JP | 2004266322 | | 9/2004 |
| JP | 2006050149 A | * | 2/2006 |
| JP | 2006186481 | | 7/2006 |
| JP | 2007336314 | | 12/2007 |
| JP | 2008-85552 A | | 4/2008 |
| JP | 2009182527 | | 8/2009 |
| JP | 2009200981 | | 9/2009 |

OTHER PUBLICATIONS

Japanese Office Action issued Oct. 2, 2012 in corresponding Japanese application No. 2009-009125.
Partial Translation and English Abstract for JP 2008-85552 A, published Apr. 10, 2008.
Chinese Office Action issued Feb. 28, 2013 in corresponding Chinese application No. 201010002526.5.

* cited by examiner

*Primary Examiner* — Anthony J Daniels
(74) *Attorney, Agent, or Firm* — NDQ&M Watchstone LLP (57) ABSTRACT

A distortion correction portion includes a distortion calculation portion which calculates a distortion based on a movement of an image sensing apparatus in the image sensing operation, a distortion adjustment value calculation portion which calculates a distortion adjustment value based on a generation situation of an input image, and a distortion correction processing portion which performs a distortion correction process for correcting the distortion in the input image based on the distortion and the distortion adjustment value. The distortion adjustment value calculation portion decreases the distortion adjustment value in accordance with a generation situation of the input image, so that the degree of the correction in the distortion correction process by the distortion correction processing portion is decreased.

8 Claims, 8 Drawing Sheets

MOVING DIRECTION OF MOVING OBJECT

IMAGE SENSING APPARATUS AND IMAGE SENSING METHOD

CROSS-REFERENCE TO RELATED APPLICATIONS

This application is based on Japanese Patent Application No. 2009-009125 filed on Jan. 19, 2009, which is incorporated herein by reference in its entirety.

BACKGROUND OF THE INVENTION

1. Field of the Invention

The present invention relates to an image sensing apparatus which takes an image and corrects a distortion of the image.

2. Description of Related Art

There are widely used image sensing apparatuses which generate images in which a shake due to a movement of the image sensing apparatus or a subject (human body or other object to be imaged) is reduced. Some of the image sensing apparatuses includes an image processing unit which detects a shake and generates an image in which the shake is reduced.

As one type of the above-mentioned shake, there is a so-called focal plane distortion (hereinafter may be referred to as a "distortion" simply). The focal plane distortion is a type of distortion that may occur, for example, in a CMOS (Complementary Metal Oxide Semiconductor) image sensor or the like in which exposure and reading of charge are restricted for each pixel (which is a so-called X-Y addressing type). In particular, the distortion may occur because of different exposure timing for each pixel row.

Figure 1A:
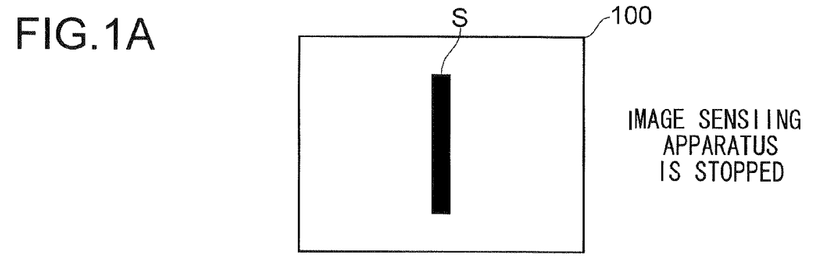
FIG. 1A is a schematic diagram of an image obtained when an image sensing apparatus is stopped.
Figure 1B:
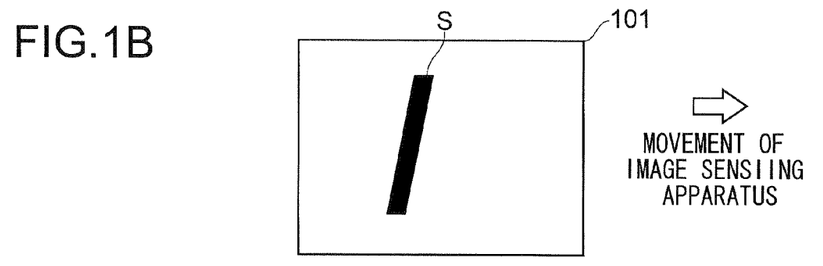
FIG. 1B is a schematic diagram of the image obtained when the image sensing apparatus is moved in parallel from the left to the right or is rotated in the pan direction from the left to the right.
Figure 1C:
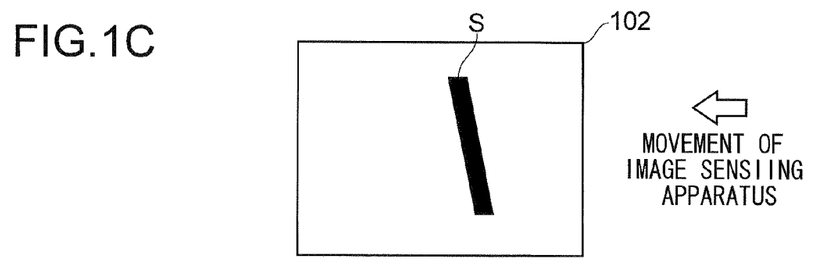
FIG. 1C is a schematic diagram of the image obtained when the image sensing apparatus is moved in parallel from the right to the left or is rotated in the pan direction from the right to the left.
Figure 1D:
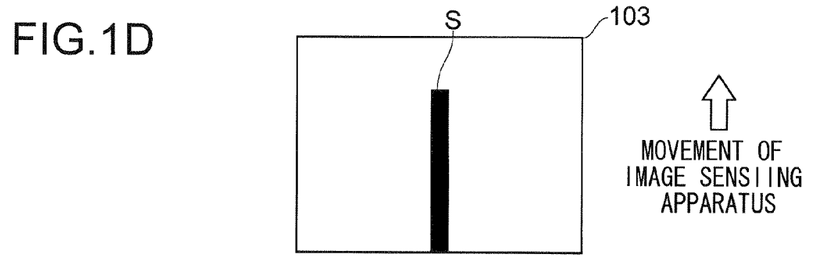
FIG. 1D is a schematic diagram of the image obtained when the image sensing apparatus is moved in parallel upward or is rotated in the tilt direction upward.
Figure 1E:
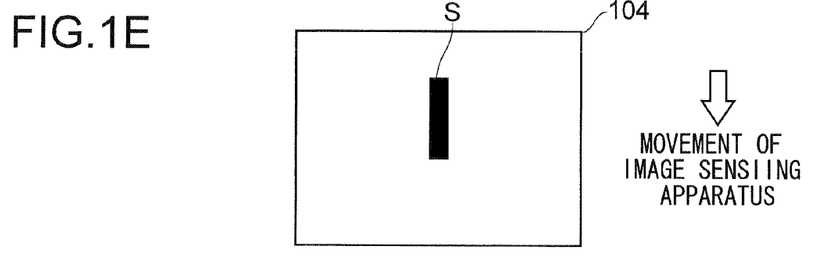
FIG. 1E is a schematic diagram of the image obtained when the image sensing apparatus is moved in parallel downward or is rotated in the tilt direction downward.

A concrete example of the focal plane distortion is illustrated in FIGS. 1A to 1E, which are schematic diagrams illustrating a focal plane distortion. FIG. 1A is a schematic diagram of an image obtained when an image sensing apparatus is stopped. FIG. 1B is a schematic diagram of the image obtained when the image sensing apparatus is moved in parallel from the left to the right or is rotated in the pan direction from the left to the right. FIG. 1C is a schematic diagram of the image obtained when the image sensing apparatus is moved in parallel from the right to the left or is rotated in the pan direction from the right to the left. FIG. 1D is a schematic diagram of the image obtained when the image sensing apparatus is moved in parallel upward or is rotated in the tilt direction upward. FIG. 1E is a schematic diagram of the image obtained when the image sensing apparatus is moved in parallel downward or is rotated in the tilt direction downward. Note that it is supposed that the image sensing apparatus performs image sensing (exposure) from the uppermost pixel row to the lower pixel row sequentially and that the subject S is stopped. In addition, FIGS. 1B to 1E illustrate the cases where constant movements of the image sensing apparatus occur during the image sensing period (during the entire exposure period of the image).

As illustrated in FIG. 1A, the image 100 is obtained when the image sensing apparatus is stopped, and a subject S is positioned in the center of the image 100. In this situation, if each movement of the image sensing apparatus occurs, the image obtained by image sensing becomes as follows. As illustrated in FIGS. 1B to 1E, the subject S in the image is distorted to move in the direction that is opposite to the movement of the image sensing apparatus, and the distortion is larger in the lower portion. For instance, if the image sensing apparatus moves horizontally from the left to the right as illustrated in FIG. 1B, the subject S in the obtained image 101 is distorted to move to the left, and the distortion is larger in the lower portion. In addition, if the image sensing apparatus moves horizontally from the right to the left as illustrated in FIG. 1C, the subject S in the obtained image 102 is distorted to move to the right, and the distortion is larger in the lower portion. In addition, if the image sensing apparatus moves vertically upward as illustrated in FIG. 1D, the subject S in the obtained image 103 is distorted and elongated downward. In addition, if the image sensing apparatus moves vertically downward as illustrated in FIG. 1E, the subject S in the obtained image 104 is distorted and shortened upward. These distortions occur because the exposure timing in the image sensing is earlier for upper pixel rows and is later for lower pixel rows as described above.

As a method of distortion correction process for reducing the focal plane distortion described above, there is proposed a method of detecting a movement of the image sensing apparatus and performing distortion correction process for correcting a distortion corresponding to the movement on the image obtained from the image sensor, so as to obtain an image with reduced distortion, for example.

However, when the distortion correction process is performed by the above-mentioned image processing, there may be the case in which wrong distortion correction process is performed. If the wrong distortion correction process is performed, the correction process may be performed on an image with no distortion, for example. As a result, a distortion may oppositely occur in an output image, resulting in a problem of degradation of the output image.

SUMMARY OF THE INVENTION

An image sensing apparatus according to the present invention includes:

an image generating portion which performs image sensing so as to generate an input image in which different regions have different exposure timings;

a movement detection portion which detects a movement of the image sensing apparatus when the image generating portion performs the image sensing;

a distortion calculation portion which calculates a distortion in the input image based on the movement detected by the movement detection portion; and a distortion correction processing portion which performs correction of the distortion calculated by the distortion calculation portion on the input image so as to generate an output image, wherein the distortion correction processing portion controls the degree of the correction of the distortion based on a situation in which the input image is generated.

DETAILED DESCRIPTION OF THE PREFERRED EMBODIMENTS

Meanings and effects of the present invention will be further apparent from the following description of embodiments. However, the embodiments described below are merely examples of the present invention, and meanings of the present invention as well as meanings of terms of individual elements are not limited to those described in the following embodiments.

An embodiment of the present invention will be described with reference to the attached drawings. First, a basic structure and a basic operation of as image sensing apparatus as an embodiment of the present invention will be described.

<<Image Sensing Apparatus>>

<Basic Structure>

Figure 2:
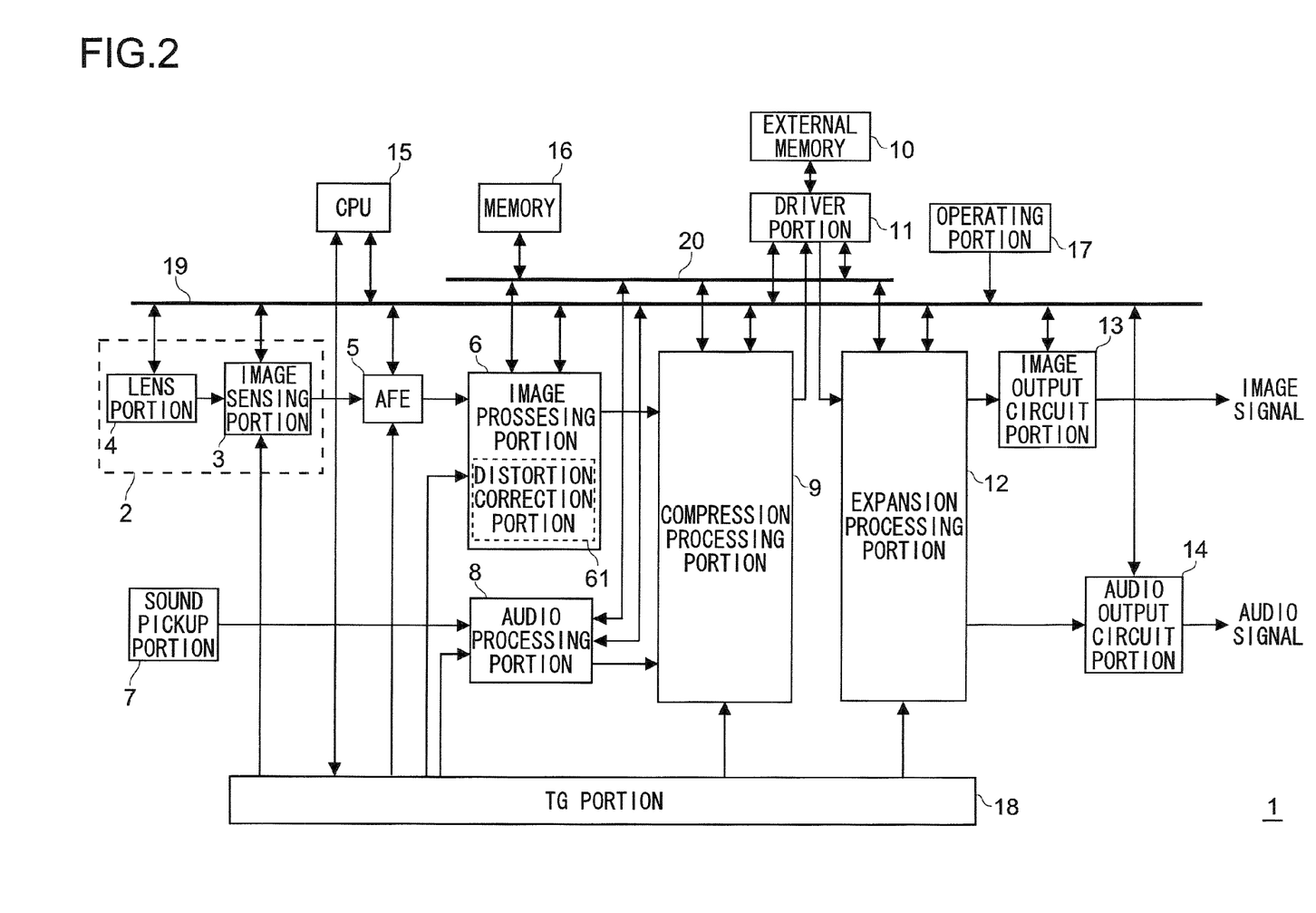
FIG. 2 is a block diagram illustrating a basic structure of an image sensing apparatus according to an embodiment of the present invention.

First, the basic structure of the image sensing apparatus according to the embodiment of the present invention will be described with reference to FIG. 2. FIG. 2 is a block diagram illustrating the basic structure of the image sensing apparatus according to the embodiment of the present invention.

As illustrated in FIG. 2, the image sensing apparatus 1 includes an image sensing portion 2 having an image sensor 3 constituted of a solid state image sensor such as a CMOS image sensor for converting input light into an electric signal, and a lens portion 4 for forming an optical image of a subject on the image sensor 3 and adjusting light amount and the like.

In addition, the image sensing apparatus 1 includes an analog front end (AFE) 5 which converts an image signal as an analog signal output from the image sensor 3 into a digital signal, an image processing portion 6 which performs various image processings such as gradation correction process on the digital image signal output from the AFE 5, a sound pickup portion 7 which converts input sound into an electric signal, an audio processing portion 8 which converts an analog audio signal output from the sound pickup portion 7 into a digital signal and performs various audio processings such as noise reduction on the audio signal, a compression processing portion 9 which performs compression coding process for moving pictures such as the MPEG (Moving Picture Experts Group) compression method on an image signal output from the image processing portion 6 and the audio signal output from the audio processing portion 8 and performs compression coding process for still pictures such as the JPEG (Joint Photographic Experts Group) compression method on the image signal output from the image processing portion 6, an external memory 10 for recording a compression coded signal compressed and coded by the compression processing portion 9, a driver portion 11 which writes and reads the compression coded signal in the external memory 10, an expansion processing portion 12 which expands and decodes the compression coded signal read out from the external memory 10 by the driver portion 11, an image output circuit portion 13 which converts the image signal obtained by decoding in the expansion processing portion 12 into the signal that can be displayed on a display apparatus (not shown) such as a display, an audio output circuit portion 14 which converts the audio signal obtained by decoding in the expansion processing portion 12 into the signal that can be reproduced by a reproduction apparatus (not shown) such as a speaker, a central processing unit (CPU) 15 which controls the entire operation of the image sensing apparatus 1, a memory 16 for storing programs for performing the processes and for temporary storing data when the program is executed, an operating portion 17 for inputting instructions from a user such as a button for starting the image sensing or a button for adjusting image sensing conditions or the like, a timing generator (TG) portion 18 for generating a timing control signal for synchronizing operation timings of individual portions, a bus line 19 for communicating data between the CPU 15 and each block, and a bus line 20 for communicating data between the memory 16 and each block.

In addition, the image processing portion 6 has a distortion correction portion 61 which corrects a distortion contained in the input image signal and output the result. Note that details of a structure of the distortion correction portion 61 will be described later.

Note that the image sensing apparatus 1 that can generate image signals of moving pictures and still pictures is described above as an example, but the image sensing apparatus 1 may be one that can generate image signals of only still pictures or only moving pictures. In addition, if the image sensing apparatus 1 has a structure that can generate image signals of only still pictures, it may have a structure without the sound pickup portion 7, the audio processing portion 8, the audio output circuit portion 14, and the like.

In addition, the external memory 10 may be any type that can record image signals and audio signals. For instance, a semiconductor memory such as an SD (Secure Digital) card, an optical disc such as a DVD, a magnetic disk such as a hard disk can be used as the external memory 10. In addition, the external memory 10 may be one that is detachably attached to the image sensing apparatus 1.

<Basic Operation>

Next, a basic operation of the image sensing apparatus 1 will be described with reference to FIG. 1. First, the image sensing apparatus 1 obtains an image signal as an electric signal by photoelectric conversion in the image sensor 3 of the input light through the lens portion 4. Then, image sensor 3 delivers the image signal to the AFE 5 at a predetermined timing in synchronization with the timing control signal supplied from the TG portion 18.

Then, the image signal that is the digital signal converted from the analog signal by the AFE 5 is supplied to the image processing portion 6. The image processing portion 6 converts the input image signal containing R (red), G (green) and B (blue) components into an image signal containing a luminance signal (Y) component and color difference signal (U and V) components, and performs various image processings such as gradation correction, edge enhancement, and the like. In addition, the memory 16 works as a frame memory and temporarily stores the image signal when the image processing portion 6 performs the processes.

In addition, based on the image signal supplied to the image processing portion 6, positions of the lenses are adjusted for focus adjustment and aperture stop is adjusted for exposure adjustment in the lens portion 4. The focus adjustment and the exposure adjustment are performed automatically to be appropriate states based on a predetermined program or are performed manually based on a user's instruction.

In addition, the image processing portion 6 corrects a distortion in the image with the distortion correction portion 61. Note that details of an operation of the distortion correction portion 61 will be described later.

When the image signal of a moving picture is generated, the sound pickup portion 7 picks up sounds. The audio signal that is picked up by the sound pickup portion 7 and is converted electric signal is supplied to the audio processing portion 8. The audio processing portion 8 converts the input audio signal into a digital signal and performs various audio processings such as noise reduction and intensity control of the audio signal. Then, the image signal output from the image processing portion 6 and the audio signal output from the audio processing portion 8 are both supplied to the compression processing portion 9 and are compressed by a predetermined compression method in the compression processing portion 9. In this case, the image signal and the audio signal are associated to each other in a temporal manner so that the image and the sound are not deviated from each other when they are reproduced. Then, the compression coded signal output from the compression processing portion 9 is recorded in the external memory 10 via the driver portion 11.

On the other hand, when the image signal of a still picture is generated, the image signal output from the image processing portion 6 is supplied to the compression processing portion 9 and is compressed by a predetermined compression method in the compression processing portion 9. Then, the compression coded signal output from the compression processing portion 9 is recorded in the external memory 10 via the driver portion 11.

The compression coded signal of the moving picture recorded in the external memory 10 is read out to the expansion processing portion 12 based on a user's instruction. The expansion processing portion 12 expands and decodes the compression coded signal so as to generate the image signal and the audio signal. Then, the image signal is supplied to the image output circuit portion 13, while the audio signal is supplied to the audio output circuit portion 14. Then, the image signal and the audio signal are converted by the image output circuit portion 13 and the audio output circuit portion 14 into the forms that can be reproduced by the display apparatus and the speaker, and the results are delivered to them.

On the other hand, the compression coded signal of the still picture recorded in the external memory 10 is supplied to the expansion processing portion 12 so that the image signal is generated. Then, the image signal is delivered to the image output circuit portion 13 and is converted by the image output circuit portion 13 into the form that can be reproduced by the display apparatus, and is delivered to them.

Note that the display apparatus and the speaker may be integral with the image sensing apparatus 1. Otherwise, they may be separated from each other and may be connected to each other via a terminal provided to the image sensing apparatus 1 and a cable.

In addition, if a current mode is a so-called preview mode for a user to confirm the image displayed on the display apparatus without recording the image signal, it is possible not to compress the image signal output from the image processing portion 6 but to output the image signal to the image output circuit portion 13. In addition, when the image signal is recorded, it is possible to deliver the image signal to the display apparatus or the like via the image output circuit portion 13 in parallel with the operations of compressing the image signal by the compression processing portion 9 and recording the result in the external memory 10.

<<Distortion Correction Portion>>
<Basic Structure>

Next, the distortion correction portion 61 provided to the image processing portion 6 illustrated in FIG. 1 will be described in detail. In the following description, for concrete description, the image signal of each image processed by the distortion correction portion 61 is referred to as each image. In particular, the image supplied to the distortion correction portion 61 is referred to as an "input image", and the image output from the distortion correction portion 61 is referred to as an "output image".

In addition, the horizontal direction of the image is the direction that is parallel to the pixel row as a unit for exposure and charge read control. In addition, the vertical direction of the image is the direction that is perpendicular to the pixel row. In addition, a difference of the exposure timing between pixel rows is problem in particular, and a difference of the exposure timing between pixels in the same pixel row is not considered because it is very small. In addition, it is supposed that the exposure timing is earlier for upper pixel rows and is later for lower pixel rows when the image sensing is performed for one image.

In addition, the image processing portion 6 of the image sensing apparatus 1 according to this embodiment can process the image signal of a moving picture and the image signal of a still picture. Therefore, each image in the following description may be interpreted as either a moving picture image or a still picture image.

Figure 3:
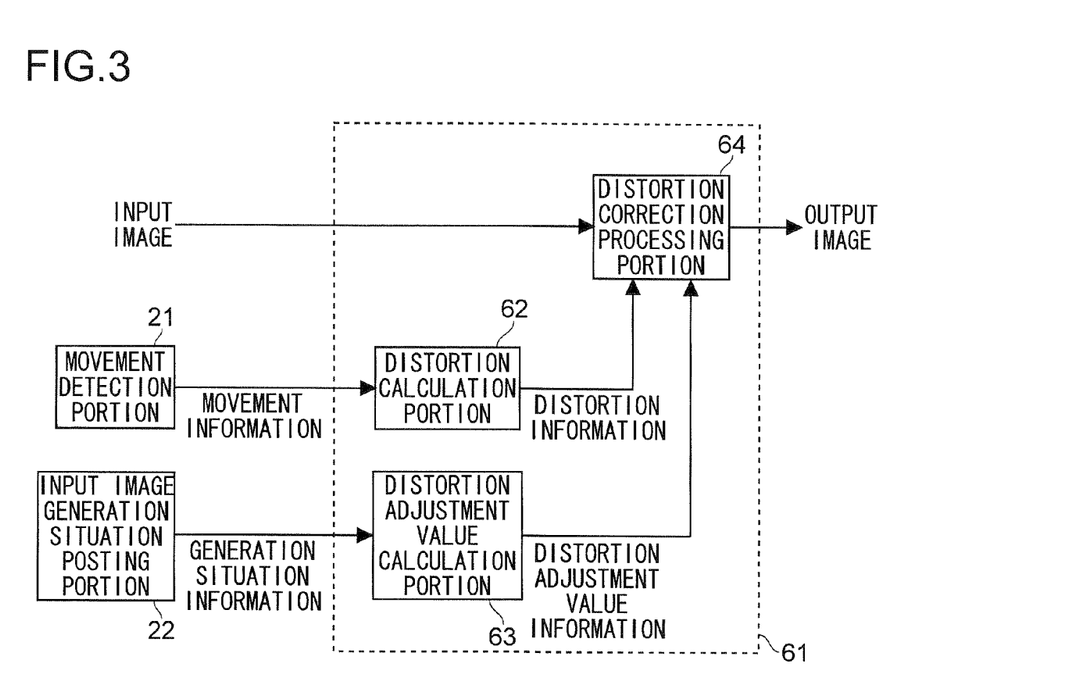
FIG. 3 is a block diagram illustrating a basic structure of a distortion correction portion provided to the image sensing apparatus according to the embodiment of the present invention.

First, a basic structure of the distortion correction portion 61 will be described with reference to FIG. 3. FIG. 3 is a block diagram illustrating a basic structure of the distortion correction portion of the image sensing apparatus according to the embodiment of the present invention. As illustrated in FIG. 3, the distortion correction portion 61 is supplied with an input image, movement information output from a movement detection portion 21 which detects a movement of the image sensing apparatus 1 when the image sensing portion 2 performs the image sensing, and generation situation information output from an input image generation situation posting portion 22 which posts a situation in which the input image to be supplied to the distortion correction portion 61 is generated.

The distortion correction portion 61 includes a distortion calculation portion 62 which calculates a distortion in the input image based on the movement information and outputs the result as distortion information, a distortion adjustment value calculation portion 63 which calculates a distortion adjustment value based on the generation situation information and outputs distortion adjustment value information, and a distortion correction processing portion 64 which performs a distortion correction process on the input image so as to generate the output image based on the distortion information output from the distortion calculation portion 62 and the distortion adjustment value information output from the distortion adjustment value calculation portion 63.

Note that the movement detection portion 21 may be, for example, a gyro sensor or the like that directly detects a movement of the image sensing apparatus 1.

In addition, the movement detection portion 21 may be one that indirectly detects the movement based on a plurality of images obtained by the image sensing. For instance, the movement detection portion 21 may be one that detects the movement by appropriately comparing the input image with another frame image of before or after the input image. Specifically, for example, it is possible to detect the movement during image sensing of the input image based on the movement obtained by comparing the input image with the frame image before the same, and the movement obtained by comparing the input image with the frame image after the same. Alternatively, it is possible to detect the movement during image sensing of the input image based on the movement obtained by comparing the image two frames before the input image with the image one frame before the input image, and movement obtained by comparing the image one frame before the input image with the input image. It is possible to use various methods as the image comparing method for detecting the movement, which include a block matching method, a representative point matching method, a gradient method and the like.

It is supposed that the movement information output from the movement detection portion 21 includes, for example, information about the magnitude and the direction of the movement of the image sensing apparatus 1 when the image sensing portion 2 performs the image sensing. In addition, it is supposed that the distortion information output from the distortion calculation portion 62 includes, for example, information about the magnitude and the direction of the distortion in the input image. Note that details of the input image generation situation posting portion 22, the generation situation information and the distortion adjustment value information will be described later.

<Basic Operation>

Figure 4:
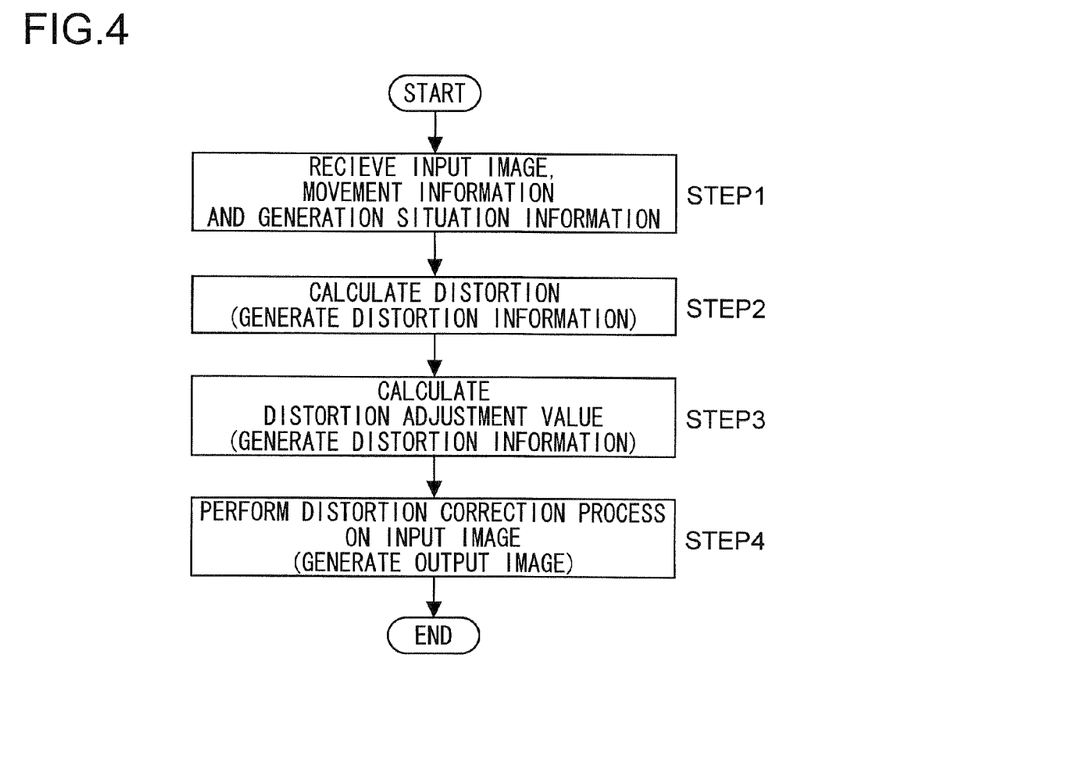
FIG. 4 is a flowchart illustrating a basic operation of the distortion correction portion provided to the image sensing apparatus according to the embodiment of the present invention.

Next, a basic operation of the distortion correction portion 61 will be described with reference to FIG. 4. FIG. 4 is a flowchart illustrating the basic operation of the distortion correction portion of the image sensing apparatus according to the embodiment of the present invention. Note that FIG. 4 illustrates a process until the output image is generated based on one input image. Therefore, the operation illustrated in FIG. 4 is performed repeatedly in the case of generating the output image of a moving picture image, for example.

As illustrated in FIG. 4, the image sensing portion 2 first performs the image sensing. In addition, a movement of the image sensing apparatus 1 in this image sensing (particularly magnitude and direction) is detected by the movement detection portion 21 so that the movement information is generated and output. Further, the generation situation information indicating the generation situation of the input image that is supplied to the distortion correction portion 61 is generated and output by the input image generation situation posting portion 61. The distortion correction portion 61 receives the input image, the movement information and the generation situation information (STEP 1).

Based on the movement information obtained in STEP 1, the distortion calculation portion 62 calculates the distortion and output the result as distortion information (STEP 2). In addition, based on the generation situation information obtained in STEP 1, the distortion adjustment value is calculated for adjusting the degree of the correction in the distortion correction process that is performed later and outputs the result as distortion adjustment value information (STEP 3).

Then, the distortion correction processing portion 64 performs the distortion correction process on the input image so as to correct the distortion calculated in STEP 2 (STEP 4). In this case, the degree of the correction is adjusted in accordance with the distortion adjustment value calculated in STEP 3. For instance, the smaller the distortion adjustment value to be close to zero, the smaller the degree of the correction becomes.

Examples of the calculation method of the distortion in STEP 2 and the distortion correction process in STEP 4 will be described with reference to FIGS. 5 to 9. FIGS. 5 to 9 are schematic diagrams illustrating an example of the distortion calculation and distortion correction process. In addition, because of the description of the distortion correction process, it is supposed that the adjustment of the degree of the correction based on the distortion adjustment value is not performed. Note that an example of the adjustment method based on the distortion adjustment value in STEP 3 will be described later.

Figure 5:
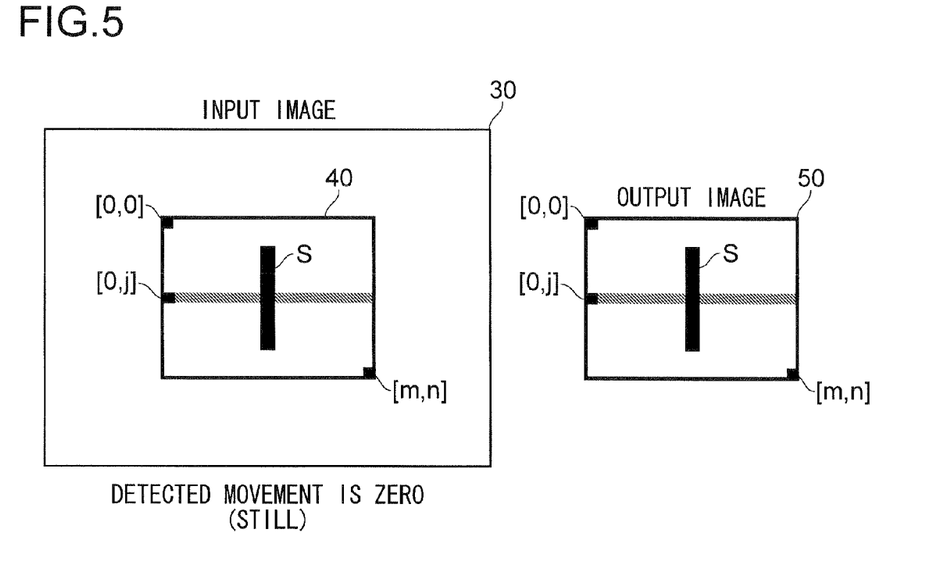
FIG. 5 is a schematic diagram illustrating an example of a distortion calculation and distortion correction process.
Figure 6:
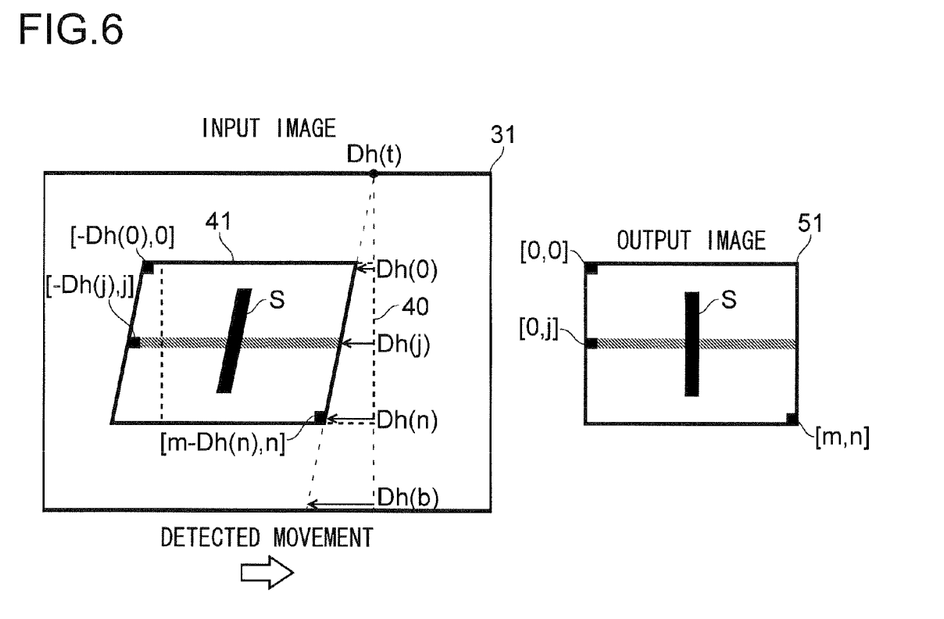
FIG. 6 is a schematic diagram illustrating the example of the distortion calculation and distortion correction process.
Figure 7:
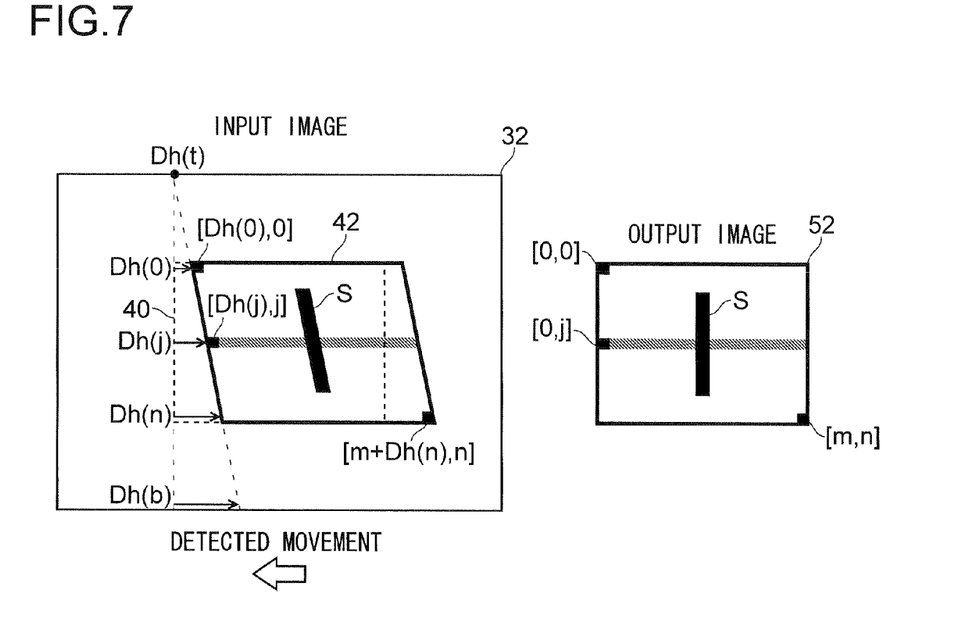
FIG. 7 is a schematic diagram illustrating the example of the distortion calculation and distortion correction process.
Figure 8:
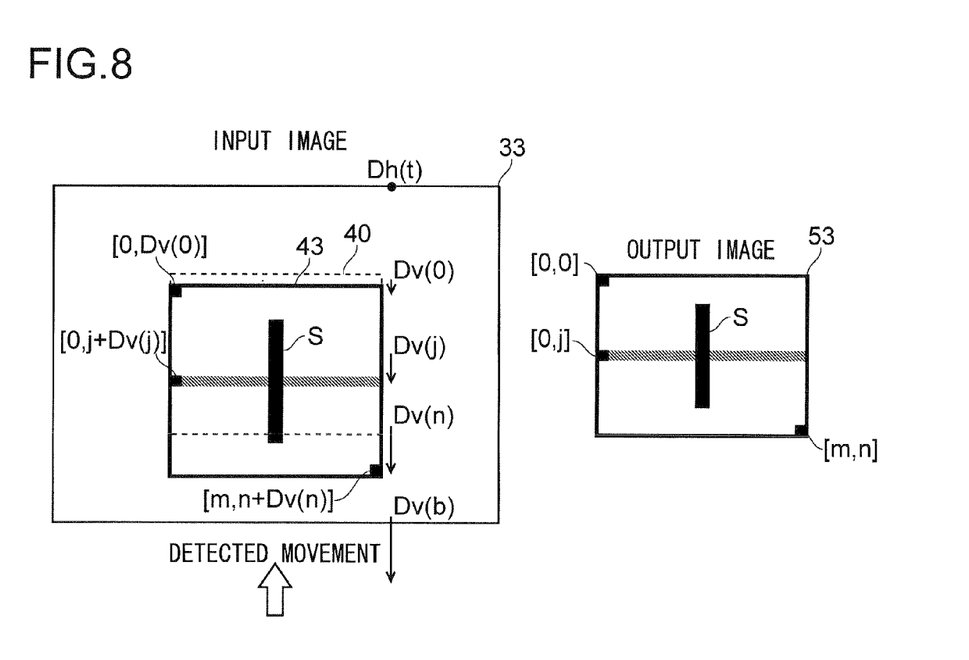
FIG. 8 is a schematic diagram illustrating the example of the distortion calculation and distortion correction process.
Figure 9:
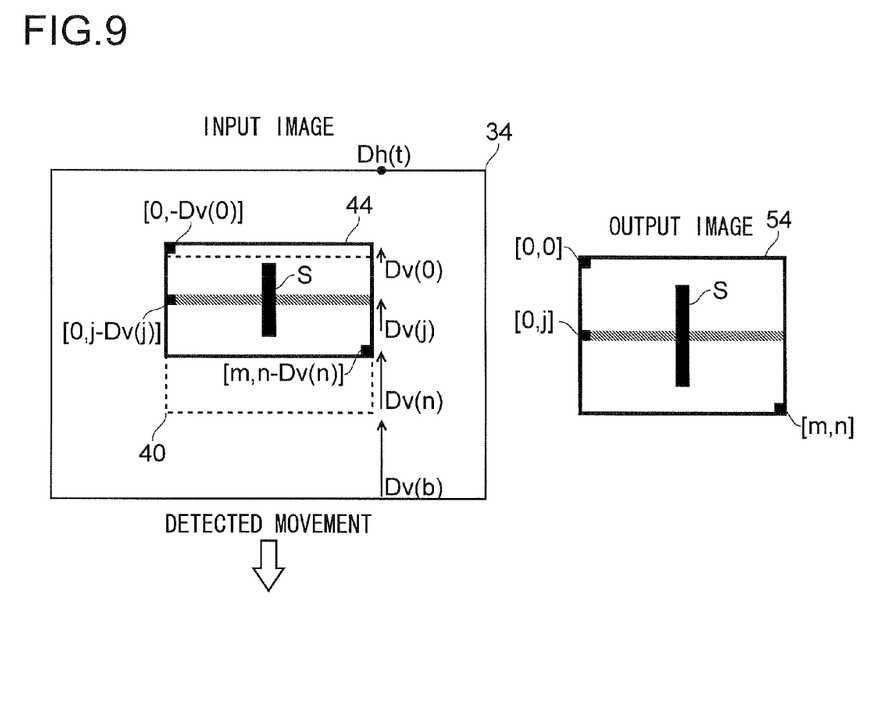
FIG. 9 is a schematic diagram illustrating the example of the distortion calculation and distortion correction process.

FIG. 5 is a diagram illustrating the above-mentioned case of FIG. 1A, in which the detected movement is zero (still). FIG. 6 is a diagram illustrating the above-mentioned case of FIG. 1B, in which the detected movement is rightward. FIG. 7 is a diagram illustrating the above-mentioned case of FIG. 1C, in which the detected movement is leftward. FIG. 8 is a diagram illustrating the above-mentioned case of FIG. 1D, in which the detected movement is upward. FIG. 9 is a diagram illustrating the above-mentioned case of FIG. 1E, in which the detected movement is downward.

Input images 30 to 34 in FIGS. 5 to 9 have an angle of view that is substantially the same as that of the image obtained from the image sensor 3. Output images 50 to 54 have an angle of view that is a part of the angle of view of the input images 30 to 34 (e.g., a middle angle of view of the input images 30 to 34).

FIGS. 6 to 9 illustrate the case where a uniform movement is detected during the image sensing of the input images 31 to 34 (during the entire exposure period of the input image) or the case where one movement is detected with respect to one input image. Further, it is supposed that the subject S is stopped and that the detected movements are correct.

In the case of FIG. 5, the distortion is zero because the detected movement is zero. In contrast, in the cases of FIGS. 6 to 9, the detected movement is not zero, and the distortion corresponding to the detected movement is calculated. The direction of the calculated distortion is opposite to the direction of the movement, and the magnitude of the distortion corresponds to the magnitude of the movement. In particular, the larger the detected movement, the larger the calculated distortion becomes. Note that the distortion is calculated for each pixel row.

In addition, it is supposed that an absolute value of the magnitude of the distortion (hereinafter referred to as a distortion value) $Dh(t)$ in the horizontal direction and a distortion value $Dv(t)$ in the vertical direction are both zero with respect to the top end pixel row t in the input images 31 to 34 in which the exposure timing is the earliest. As illustrated in FIGS. 6 to 9, the distortion value calculated when a uniform movement or one movement is detected is larger for a lower pixel row in proportion. In particular, in the case of FIGS. 6 and 7 in which the movement in the horizontal direction is detected, the distortion value $Dh(b)$ in the horizontal direction of the bottom end pixel row b in the input images 31 and 32 in which exposure timing is the latest becomes largest. On the other hand, in the case of FIGS. 8 and 9 in which the movement in the vertical direction is detected, the distortion value Dv(b) in the vertical direction of the bottom end pixel row b in the input images 33 and 34 becomes largest.

If the distortion is zero as illustrated in FIG. 5, the image within the output image region 40 as a part region of the input image 30 is cropped as it is so as to obtain the output image 50. Note that the upper left pixel position in the output image region 40 is [0, 0], the lower left pixel position is [0, n], the upper right pixel position is [m, 0], and the lower right pixel position is [m, n] (m and n are natural numbers). In addition, the pixel positions of the output images 50 to 54 are also expressed in the same manner. In other words, the output image region 40 and the output images 50 to 54 includes m+1 pixels arranged in the horizontal direction and n+1 pixels arranged in the vertical direction.

In the case where the input image has the distortion as illustrated in FIGS. 6 to 9, if the image in the output image region 40 is cropped as it is, the cropped image has the distortion. Therefore, in accordance with the calculated distortion, pixels in the distortion output image regions 41 to 44 that are obtained by distorting the output image region 40 are red out (i.e., the images in the distortion image regions 41 to 44 are distorted oppositely so as to cancel the distortion). Thus, the output images 51 to 54 which are substantially the same as the output image 50 in the case where no movement is detected as illustrated in FIG. 5 can be obtained.

Positions of the distortion output image regions 41 to 44 in the cases of FIGS. 6 to 9 will be described concretely. In the following description, the distortion value in the horizontal direction that is calculated with respect to a pixel in a pixel row j in the output image region 40 is represented by Dh(j), and the distortion value in the vertical direction of the same is represented by Dv(j) (j is a natural number satisfying $0 \leq j \leq n$).

If the leftward distortion as illustrated in FIG. 6 is calculated, the distortion output image region 41 is obtained by distorting the output image region 40 leftward. In this case, individual pixel positions in the output image region 40 are moved leftward by Dh(j) so as to obtain the distortion output image region 41. In this case, pixels of [−Dh(j), j] to [m−Dh(j), j] are read out so as to obtain the pixel row j in the output image 51.

In addition, if the rightward distortion as illustrated in FIG. 7 is calculated, the distortion output image region 42 is obtained by distorting the output image region 40 rightward. In this case, individual pixel positions in the output image region 40 are moved rightward by Dh(j) so as to obtain the distortion output image region 42. In this case, pixels of [Dh(j), j] to [m+Dh(j), j] are read out so as to obtain the pixel row j in the output image 52.

In addition, if the downward distortion is calculated as illustrated in FIG. 8, the distortion output image region 43 is obtained by distorting the output image region 40 downward. In this case, individual pixel positions in the output image region 40 are moved downward by Dv(j) so as to obtain the distortion output image region 43. In this case, pixels of [0, J+Dv(j)] to [m, J+Dv(j)] are read out so as to obtain the pixel row j in the output image 53.

In addition, if the upward distortion is calculated as illustrated in FIG. 9, the distortion output image region 44 is obtained by distorting the output image region 40 upward. In this case, individual pixel positions in the output image region 40 are moved upward by Dv(j) so as to obtain the distortion output image region 44. In this case, pixels of [0, j−Dv(j)] to [m, j−Dv(j)] are read out so as to obtain the pixel row j in the output image 54.

If the movement detected by the movement detection portion 21 and the distortion calculated by the distortion calculation portion 62 are always correct every time, it is sufficient for the distortion correction processing portion 64 to perform the distortion correction process so as to cancel the calculated distortion on the input image. However, there is a problem because the detected movement or the calculated distortion is not always correct every time.

Therefore, in the present invention, the distortion adjustment value calculation portion 63 decides based on the situation where the input image is generated whether the distortion calculated by the distortion calculation portion 62 should be used as it is for the correction or it should be used for the correction after suppressing the degree of the same, and calculates a distortion adjustment value. Then, the distortion correction processing portion 64 adjusts the degree of the correction in the distortion correction process based on the distortion adjustment value.

With this structure, it is possible to suppress occurrence of an output image distorted contrarily due to a wrong distortion correction process.

Note that it is possible to generate the output image by distorting the entire of the input images 31 to 34. However, if the output images 51 to 54 are generated by cropping a part of the input images 31 to 34 as illustrated in FIGS. 6 to 9, it is possible to avoid defective output images 51 to 54.

In addition, in the example of the distortion correction process illustrated in FIGS. 5 to 9, an example of reading out pixels in the output image region 40 or the distortion output image regions 41 to 44 so as to generate the output images 51 to 54. However, it is possible to read out the output image region 40 or the distortion output image regions 41 to 44 together with pixels around the same so as to use the pixels for generating the output images 50 to 54.

In addition, it is possible to perform various image processings on pixels read out for generating the output images 50 to 54, so that the number of pixels in the output images 50 to 54 becomes different from the number of pixels in the output image region 40 or in the distortion output image regions 41 to 44. For instance, it is possible to perform an interpolation process or the like so as to increase the number of pixels in the output images 50 to 54, or to perform a thinning process or a pixel addition so as to reduce the number of pixels in the output images 50 to 54.

In addition, the magnitude of the calculated distortion may be defined as pixel unit (i.e., magnitudes of Dh(j) and Dv(j) may be integers). With this structure, there is always a pixel to be read out. On the other hand, the magnitude of the calculated distortion may be any value (i.e., magnitudes of Dh(j) and Dv(j) may be any value except an integer). In this case, if the position of the pixel to be read is a decimal fraction, it is possible to read out a pixel that is closest to the position or to calculate the pixel at the position using pixels around the position.

In addition, FIGS. 6 to 9 illustrate the case where the movement in either the horizontal direction or the vertical direction is detected and the distortion in either direction is calculated for simple description. However, as a matter of course, there will be the case where a movement in a slanting direction is detected and a distortion in the slanting direction is calculated. In this case, movements in both directions may be detected and distortions in both directions may be calculated.

In addition, the case where the distortion is zero with respect to the top end pixel row t in the input image is described above, but it is possible that the distortion is zero with respect to the top end pixel row 0 in the output image region 40. With this definition too, the distortion correction process can be performed.

Figure 10:
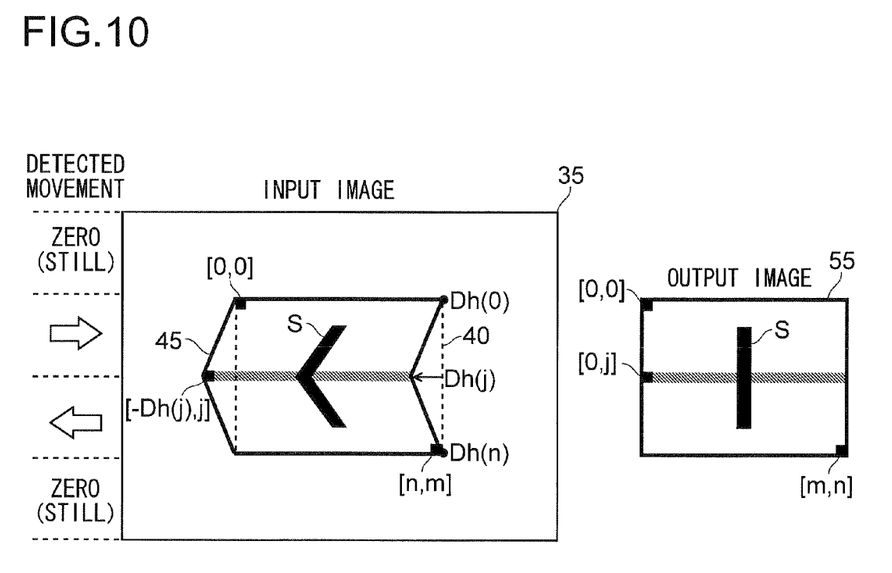
FIG. 10 is a schematic diagram illustrating the example of the distortion calculation and distortion correction process.

In addition, as illustrated in FIG. 10, it is possible to divided the input image 35 unto a plurality of regions in the vertical direction, and to detect the movement for each region so as to calculate the distortion for each region. In this case, the output image region 40 is distorted for each region so that the distortion output image region 45 is generated.

<Distortion Adjustment Value>

A calculation method of the distortion adjustment value in STEP 3 of FIG. 2 and an adjustment method of the degree of the correction in the distortion correction process using the distortion adjustment value will be described. First, the adjustment method using the distortion adjustment value will be described, and afterward examples of the calculation method of the distortion adjustment value will be described.

[Adjustment Method]

In the above description with reference to FIGS. 6 to 10, the distortion value Dh(j) in the horizontal direction and the distortion value Dv(j) in the vertical direction are used as they are for deciding the distortion output image regions 41 to 45 in the distortion correction process of STEP 4. However, if the distortion adjustment value calculated in STEP 3 is used for adjusting the degree of the correction in the distortion correction process, positions of the distortion output image regions 41 to 45 are decided by using a "distortion value after the adjustment" calculated based on the following equation (1) in STEP 4.

$$Sh(j)=Kh \times Dh(j)$$

$$Sv(j)=Kv \times Dv(j) \quad (1)$$

As shown in the above equation (1), the distortion adjustment value Kh in the horizontal direction is multiplied to the distortion value Dh(j) in the horizontal direction so that distortion Sh(j) after the adjustment in the horizontal direction is calculated. In addition, similarly, the distortion adjustment value Kv in the vertical direction is multiplied to the distortion value Dv(j) in the vertical direction so that a distortion value after the adjustment Sv(j) in the vertical direction is calculated. It is supposed that the distortion adjustment values Kh and Kv satisfy "$0 \leq Kh, Kv \leq 1$".

If the distortion adjustment values Kh and Kv are one, the distortion values Sh(j) and Sv(j) after the adjustment are equal to the distortion values Dh(j) and Dv(j). In other words, similarly to the case illustrated in FIGS. 6 to 10, the distortion values after the adjustment are equal to the values in the case where the adjustment by the distortion adjustment values Kh and Kv is not performed. In addition, if the distortion adjustment values Kh and Kv are zero, the distortion values Sh(j) and Sv(j) after the adjustment becomes zero. In other words, the distortion values after the adjustment are equal to the values in the case where the distortion correction process is not performed.

As described above, the detected movement is not always correct. For instance, if a gyro sensor is used for detecting the movement, a detection error due to a drift component (a signal value output in the static state) or the like may occur. In addition, for example, if the movement is detected based on image comparison, a detection error due to a movement of the subject (e.g., fluctuations of plants) or a feature of the image may occur.

Therefore, in accordance with the generation situation of the input image (e.g., in the case where the input image is a type that is difficult to recognize an effect of the distortion correction process or a type in which a distortion hardly occur), the degree of the distortion correction process is decreased. Thus, it is possible to suppress the case where the distortion correction process is performed with a large degree incorrectly so that the input image is distorted on the contrary.

In addition, it is possible not to perform the distortion correction process in accordance with the generation situation of the input image. In this case, it is possible not only to suppress the case where the distortion correction process is performed with a large degree incorrectly but also to simplify the process. Therefore, it is possible to increase the process speed or to reduce power consumption.

Note that it is possible to calculate the distortion adjustment values Kh and Kv for each input image, or each pixel row of the input image, or for each region of the predetermined regions illustrated in FIG. 10.

[Calculation Method of the Distortion Adjustment Value]

Hereinafter, examples of the calculation method of the distortion adjustment value described above will be described.

EXAMPLE 1

Example 1 of the calculation method of the distortion adjustment value will be described. In this example, the distortion adjustment values Kh and Kv are set in accordance with whether or not the camera shake correction process is provided.

As the camera shake correction process, there is an optical camera shake correction process in which the image sensing portion 2 is driven so as to cancel the detected movement (shake) of the image sensing apparatus 1, or an electronic camera shake correction process in which a shake is corrected by image processing, for example. As the electronic camera shake correction process, there is a one that generates the input image to be supplied to the distortion correction portion 61 by cropping a region having a similar angle of view based on similarity between detected images that are supplied from the image sensing portion 2 and are compared sequentially or based on the movement of the image sensing apparatus 1 that is sensed directly by a gyro sensor or the like, for example. These camera shake correction processes are performed by a driving portion (not shown) provided to the image sensing portion 2, the image processing portion 6, the CPU 15 and the like illustrated in FIG. 1. Note that these portions are interrupted to be a "camera shake correction portion".

In this example, the generation situation information that is supplied to the distortion adjustment value calculation portion 63 illustrated in FIG. 3 is camera shake correction process information indicating whether or not the camera shake correction process is performed on the input image. In this case, the input image generation situation posting portion 22 may be constituted of the camera shake correction portion.

If the camera shake correction process information indicating that the camera shake correction process is not performed is supplied, the distortion adjustment value calculation portion 63 sets the distortion adjustment values Kh and Kv to values smaller than those in the case where the camera shake correction process information indicating that the camera shake correction process is performed is supplied. Otherwise, the distortion adjustment values Kh and Kv are set to zero.

If the camera shake correction process is not performed, in particular if the input image is a moving picture image, the positional displacement between successive input images becomes large. In this case, the focal plane distortion is not visually conspicuous when the obtained moving picture image is reproduced. Therefore, if the camera shake correction process is not performed, the distortion adjustment values Kh and Kv are set to small values or zero. Thus, it is possible to suppress the case where the distortion correction process is performed with a large degree incorrectly and to increase the process speed or to reduce power consumption.

Note that the distortion adjustment values Kh and Kv may be set to one if the camera shake correction process is performed. In addition, the distortion adjustment values Kh and Kv may be set to a value in the range of 0 to 0.5 if the camera shake correction process is not performed. In addition, whether to perform the camera shake correction process or not may be selected by the user (e.g., by using the operating portion 17 illustrated in FIG. 1) or by the program or the like in the image sensing mode automatically.

EXAMPLE 2

Example 2 of the calculation method of the distortion adjustment value will be described. In this example, the distortion adjustment values Kh and Kv are set in accordance with whether or not the image sensing apparatus 1 is set.

In this example, the generation situation information that is supplied to the distortion adjustment value calculation portion 63 illustrated in FIG. 3 is the fixing information that indicates whether or not the image sensing apparatus 1 is fixed when the image sensing portion 2 performs the image sensing. In this case, the input image generation situation posting portion 22 may be constituted of the CPU 15 or the like.

The distortion adjustment value calculation portion 63 sets the distortion adjustment values Kh and Kv to zero if the fixing information indicating that the image sensing apparatus 1 is fixed when the image sensing portion 2 performs the image sensing is supplied.

If the image sensing apparatus 1 is fixed on a tripod or the like, the focal plane distortion does not occur basically. Therefore, if a movement is detected or a distortion is calculated, there is high possibility of misdetection or miscalculation. Therefore, in this case, the distortion adjustment values Kh and Kv are set to zero. Thus, it is possible to suppress the case where the distortion correction process is performed with a large degree incorrectly and to increase the process speed or to reduce power consumption.

Note that it is possible to decide whether the image sensing apparatus 1 is fixed or not based on a plurality of movement information of input images output from the movement detection portion 21 (movement information obtained by comparing a plurality of input images or movement information obtained from an output value of the gyro sensor when each of the plurality of input images is sensed). For instance, if the detected magnitude of the movement is a threshold value th1 or smaller for a certain period t1 or longer, it may be decided that the image sensing apparatus 1 is fixed. In this case, the movement detection portion 21 may also constitute the input image generation situation posting portion 22 so as to output the fixing information.

In addition, it is possible to decide that the image sensing apparatus 1 is fixed based on information input by the user (e.g., input with the operating portion 17 illustrated in FIG. 1). It is possible that a switch or the like that is pressed when the image sensing apparatus 1 is fixed on a tripod or the like is provided to the image sensing apparatus 1, so that it is decided that the image sensing apparatus 1 is fixed based on the switch information. In addition, it is possible to decide based on whether or not a self timer is used for the image sensing. If the self timer is used for the image sensing, there is high possibility that the image sensing apparatus 1 is fixed, so it can be decided that it is fixed.

In addition, the fixing information may be output for each of the horizontal direction and the vertical direction. In this case, only the distortion adjustment value in the direction that is indicated to be fixed by the fixing information is set to zero.

EXAMPLE 3

Example 3 of the calculation method of the distortion adjustment value will be described. In this example, the distortion adjustment values Kh and Kv are set based on whether or not a movement of the image sensing apparatus 1 occurs continuously in the same direction.

In this example, the generation situation information that is supplied to the distortion adjustment value calculation portion 63 illustrated in FIG. 3 is the continuous movement information indicating whether or not a movement of the image sensing apparatus 1 occurs continuously in the same direction. In this case, the movement detection portion 21 may also constitute the input image generation situation posting portion 22.

If the continuous movement information indicating that continuous movement in the same direction occurs is supplied, the distortion adjustment value calculation portion 63 sets the distortion adjustment values Kh and Kv to values smaller than those in the case where the continuous movement information indicating a continuous movement in the same direction does not occur. Otherwise, the distortion adjustment values Kh and Kv are set to zero.

If a continuous movement of the image sensing apparatus 1 in the same direction occurs (e.g., if image sensing with panning or tilting is performs), in particular if the input image is a moving picture image, the positional displacement between successive input images becomes large similarly to the case of Example 1. Therefore, the focal plane distortion is not visually conspicuous in a reproduction mode. Therefore, if a continuous movement in the same direction occurs, the distortion adjustment values Kh and Kv are set to small values or zero. Thus, it is possible to suppress the case where the distortion correction process is performed with a large degree incorrectly and to increase the process speed or to reduce power consumption.

Note that if a movement in the same direction is detected for a certain period t2 or longer, it is possible to decide that a continuous movement in the same direction has occurred. In addition, it is possible to regard the fact that a movement of a magnitude of a predetermined threshold value th2 or larger is detected as a requirement to decide that a continuous movement in the same direction has occurred.

In addition, the distortion adjustment values Kh and Kv when it is not decided that the continuous movement in the same direction has occurred may be set to one. In addition, the distortion adjustment values Kh and Kv when it is decided that the continuous movement in the same direction has occurred may be set to a value within the range of 0 to 0.5.

EXAMPLE 4

Example 4 of the calculation method of the distortion adjustment value will be described. In this example, the distortion adjustment values Kh and Kv are set based on whether or not the input image is obtained by image sensing of a moving object (i.e., whether or not a moving object is contained in the input image). The calculation method of this example can be applied to the case where the movement detection portion 21 detects a movement from a picture image.

In this example, the generation situation information that is supplied to the distortion adjustment value calculation portion 63 illustrated in FIG. 3 is moving object information that indicates whether or not a moving object exists in the input image. In this case, the movement detection portion 21 may also constitute the input image generation situation posting portion 22.

If the moving object information indicating that a moving object exists in the input image is supplied, the distortion adjustment value calculation portion 63 sets the distortion adjustment value to zero.

Figure 11:
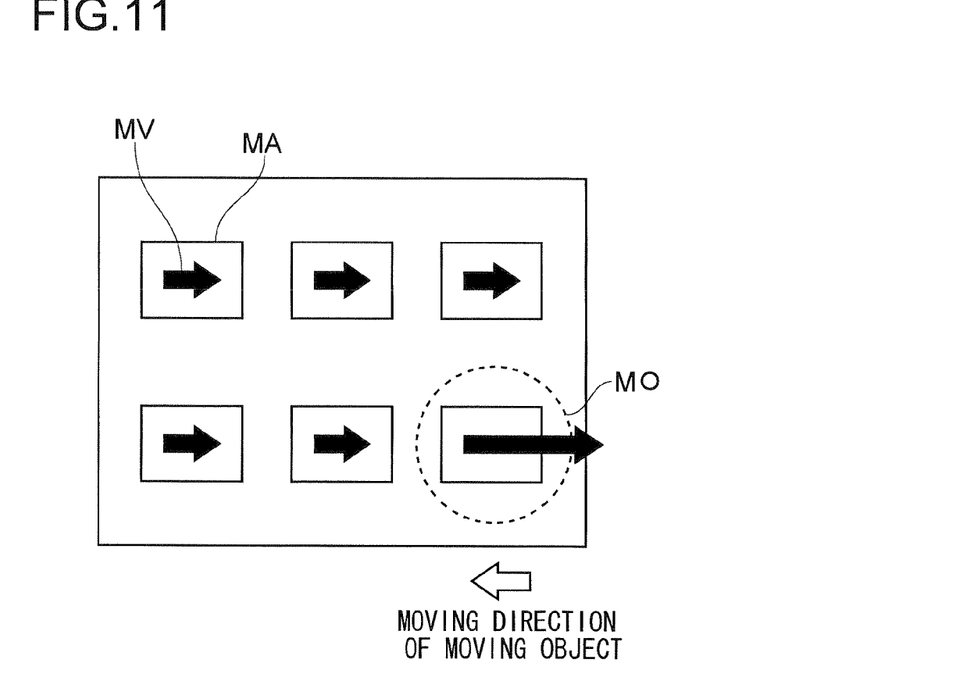
FIG. 11 is a schematic diagram of an input image illustrating an example of a movement detection method.

If the movement detection portion 21 compares a plurality of images so as to detect a movement, and if a moving object is contained in the input image, accuracy of detecting a movement is deteriorated because of an influence of the moving object. An example of this will be described with reference to FIG. 11. FIG. 11 is a schematic diagram of the input image illustrating an example of the movement detection method. The movement detection method illustrated in FIG. 11 is a method of determining a motion vector MV for each of six movement detection regions MA in the input image, and evaluating the motion vectors MV in an integral manner so as to detect a movement. In addition, FIG. 11 illustrates the case where a moving object MO exists in the lower right movement detection region MA.

If a moving object MO does not exist, substantially equal motion vectors MV are calculated in all the movement detection regions MA. However, if a moving object MO exists as illustrated in FIG. 11, an incorrect motion vector MV is calculated from the movement detection region MA that is affected by the moving object MO. Therefore, reliability of the detection result of the movement is decreased. In other words, reliability of the calculated distortion is decreased. In this case, an abnormally large distortion is calculated depending on the situation, and the distortion correction process may be performed with a large degree incorrectly so that the input image is distorted on the contrary.

Therefore, if the moving object MO is contained in the input image like this example, the distortion adjustment values Kh and Kv are set to zero. Thus, it is possible to suppress the case where the distortion correction process is performed with a large degree incorrectly and to increase the process speed or to reduce power consumption.

Note that the movement detection portion 21 may determine a variation (e.g., variance) of the calculated motion vectors MV for deciding whether or not the moving object MO exists.

For instance, in the case of FIG. 11, it is possible to calculate the variation in the method of the following equation (2) and to decide whether or not the moving object MO exists based on the calculated value. In the following equation (2), the motion vector calculated from each of the six movement detection regions MA is denoted by $MV_i$, and an average motion vector of these motion vectors $MV_i$ is denoted by $MV_m$. Then, it is possible to decide that the moving object MO exists if the variation s obtained from the following equation (2) is a threshold value th3 or larger.

$$\sigma = \sum_{i=1}^{6} (MV_i - MV_m)^2 \quad (2)$$

EXAMPLE 5

Example 5 of the calculation method of the distortion adjustment value will be described. In this example, the distortion adjustment values Kh and Kv are set based on of the reliability of the detection result of the movement detected by the movement detection portion 62. Note that the distortion calculation portion 62 calculates a distortion based on the detected movement. Therefore, it is possible to interpret the reliability of the detection result of the movement as reliability of calculated distortion.

In this example, the generation situation information that is supplied to the distortion adjustment value calculation portion 63 illustrated in FIG. 3 is the reliability information indicating a magnitude of reliability of the detection result of the movement detected by the movement detection portion 21. In this case, the movement detection portion 21 may also constitute the input image generation situation posting portion 22.

The distortion adjustment value calculation portion 63 sets the distortion adjustment values Kh and Kv to smaller values or zero as the reliability of the input reliability information is smaller.

If the reliability information indicates that the reliability of the detection result of the detected movement is small, there is high possibility that the calculated distortion is incorrect. Therefore, depending on the situation, abnormally large distortion may be calculated, and the distortion correction process may be performed with a large degree incorrectly so that the input image is distorted on the contrary.

Therefore, if the reliability of the detection result of the detected movement is small like this example, the distortion adjustment values Kh and Kv are set to small values or zero. Thus, it is possible to suppress the case where the distortion correction process is performed with a large degree incorrectly and to increase the process speed or to reduce power consumption.

Note that the calculation method of the reliability e may be one corresponding to the detection method of the movement by the movement detection portion 21. For instance, if the movement detection portion 21 compares a plurality of images so as to detect the movement, it is possible to calculate based on a contrast value of the compared image (e.g., divergence of distribution of a luminance value) or the variation s of the motion vector MV described in Example 4. If the contrast value is small, the entire input image becomes a uniform image with few characteristics. In this case, it is difficult to detect the movement by comparing images. Therefore, the reliability e is decreased. In addition, as described in Example 4, the reliability e is decreased also in the case where the variation s of the motion vectors MV is small.

In addition, for example, if a sensor such as a gyro sensor is used for detecting the movement, it is possible to calculate the reliability e based on whether or not the operating environment is substantially one where the movement can be detected appropriately.

Figure 12:
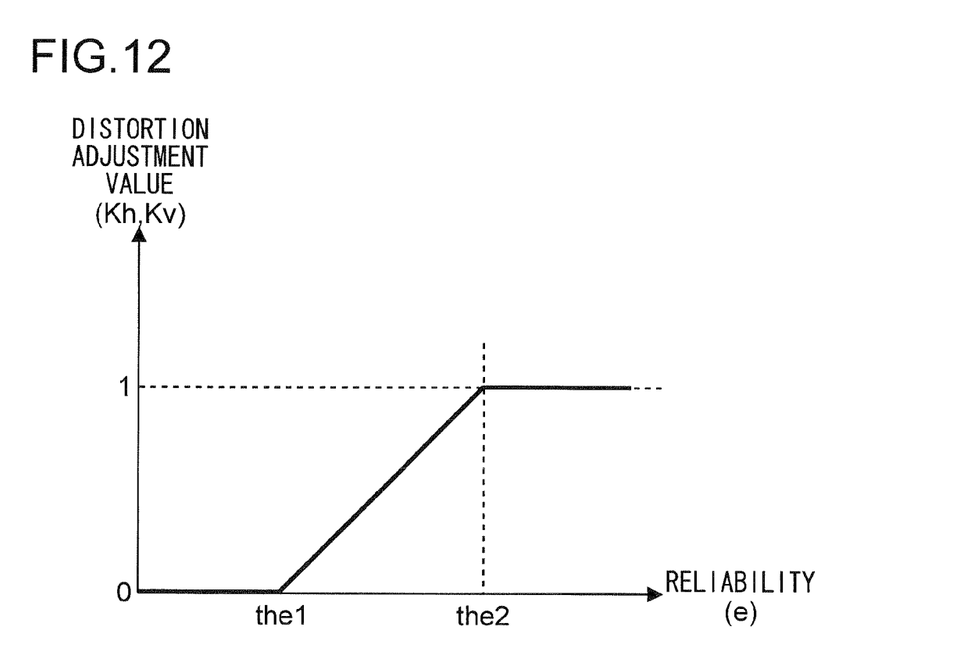
FIG. 12 is a graph illustrating a calculation method of a distortion adjustment value according to Example 5.

In addition, it is possible to adopt a structure in which the distortion adjustment value calculation portion 63 calculates the distortion adjustment values Kh and Kv as illustrated in FIG. 12 and the following equation (3). FIG. 12 is a graph illustrating a calculation method of the distortion adjustment value according to Example 5. As illustrated in FIG. 12 and the following equation (3), if the reliability e is 0 or larger and is smaller than a threshold value the1, the distortion adjustment values Kh and Kv are set to zero. In addition, if the reliability e is a threshold value the2 or larger, the distortion adjustment values Kh and Kv are set to one. In addition, if the reliability e is the threshold value the1 or larger and is smaller than the threshold value the2, the distortion adjustment values Kh and Kv are increased a little (e.g., increased linearly) in accordance with the reliability e.

$$Kh, Kv = \begin{cases} 0 & (0 \leq e < \text{the } 1) \\ \dfrac{e - \text{the } 1}{\text{the } 2 - \text{the } 1} & (\text{the } 1 \leq e < \text{the } 2) \\ 1 & (\text{the } 2 \leq e) \end{cases} \quad (3)$$

EXAMPLE 6

Example 6 of the calculation method of the distortion adjustment value will be described. In this example, the distortion adjustment values Kh and Kv are set based on a zoom magnification.

In this example, the generation situation information that is supplied to the distortion adjustment value calculation portion 63 illustrated in FIG. 3 is the zoom magnification information indicating the zoom magnification (optical) of the lens portion 4 when the image sensing portion 2 performs the image sensing. In this case, the input image generation situation posting portion 22 may be constituted of the CPU 15 or the image sensing portion 2.

The distortion adjustment value calculation portion 63 sets the distortion adjustment values Kh and Kv to smaller values or zero as the zoom magnification indicated by the input zoom magnification information is smaller.

If the zoom magnification of the lens portion 4 is large (i.e., in the case of image sensing with a telephotographic lens), a distortion due to camera shake or subject movement is apt to be large. On the other hand, if the zoom magnification of the lens portion is small (i.e., in the case of image sensing with a wide-angle lens), a distortion is apt to be small. Therefore, if a large distortion is calculated in the case of a small zoom magnification, there is high possibility of miscalculation. In this case, the distortion correction process may be performed with a large degree incorrectly so that the input image is distorted on the contrary.

Therefore, if the zoom magnification is small like this example, the distortion adjustment values Kh and Kv is set to small values or zero. Thus, it is possible to suppress the case where the distortion correction process is performed with a large degree incorrectly and to increase the process speed or to reduce power consumption. In addition, if the zoom magnification is small, a distortion is not conspicuous compared with the case of a large zoom magnification. Therefore, even if the distortion the degree of the correction is set to a small value, an appropriate output image can be obtained.

Figure 13:
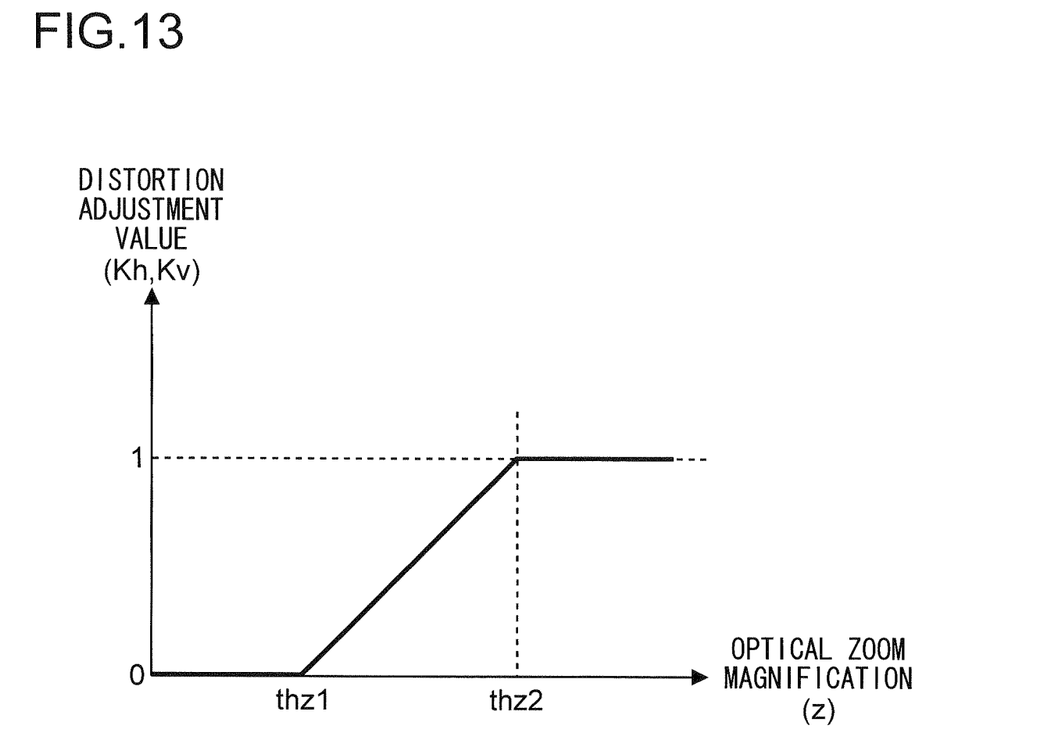
FIG. 13 is a graph illustrating a calculation method of a distortion adjustment value according to Example 6.

Note that it is possible to adopt a structure in which the distortion adjustment value calculation portion 63 calculates the distortion adjustment values Kh and Kv as illustrated in FIG. 13 and the following equation (4). FIG. 13 is a graph illustrating a calculation method of the distortion adjustment value according to Example 6. As illustrated in FIG. 13 and the following equation (4), if the zoom magnification z is zero or larger and is smaller than a threshold value thz1, the distortion adjustment values Kh and Kv are set to zero. In addition, if the zoom magnification z is a threshold value thz2 or larger, the distortion adjustment values Kh and Kv are set to one. In addition, if the zoom magnification z is the threshold value thz1 or larger and is smaller than the threshold value thz2, the distortion adjustment values Kh and Kv are increased a little (e.g., increased linearly) in accordance with the zoom magnification z.

$$Kh, Kv = \begin{cases} 0 & (0 \leq z < thz1) \\ \dfrac{z - thz1}{thz2 - thz1} & (thz1 \leq z < thz2) \\ 1 & (thz2 \leq z) \end{cases} \quad (4)$$

VARIATION EXAMPLE

Examples 1 to 6 described above can be combined. For instance, it is possible that distortion adjustment value calculation portion 63 performs weighted addition of the distortion adjustment values Kh and Kv calculated by using a plurality of Examples described above (overall distortion adjustment value) so that the distortion adjustment value information contains the overall distortion adjustment value, which is delivered to the distortion correction processing portion 64. Then, the distortion correction processing portion 64 may perform the distortion correction process on the input image based on the overall distortion adjustment value.

In addition, in the case of this variation example, if the calculation method of confirming that the distortion cannot occur like Example 2 is used, for example, it is possible to force the overall distortion adjustment value to be zero regardless of the distortion adjustment values Kh and Kv by other calculation method if it is confirmed that the distortion cannot occur.

In addition, the distortion after the adjustment is defined by the equation (1) in each example described above. Therefore, the degree of the distortion correction process is set to a smaller value as the distortion adjustment value is smaller (closer to zero). However, the present invention is not limited to this example. The definition of the distortion after the adjustment, and the predetermined value of the distortion adjustment value that minimizes the degree of the distortion correction process can be set in any manner as long as the above-mentioned effect can be obtained.

<<Other Embodiments>>

In addition, concerning the image sensing apparatus 1 according to the embodiment of the present invention, operations of the image processing portion 6, the distortion correction portion 61 and the like may be performed by a control unit such as a microprocessor. Further, a whole or a part of the functions realized by the control unit may be described as a program so that a program executing device (e.g., a computer) can execute the program, so that the whole or the part of the functions is realized.

In addition, without limited to the case described above, the image sensing apparatus 1 illustrated in FIG. 2 or the distortion correction portion 61 illustrated in FIG. 3 can be realized by hardware or a combination of hardware and software. In addition, if the image sensing apparatus 1 or the distortion correction portion 61 is constituted with software, the block diagram of portions realized by software indicate a functional block diagram of the portion.

Although the embodiment of the present invention is described above, the scope of the present invention is not limited to the embodiment, which can be modified variously within the scope of the present invention without deviating from the spirit of the present invention.

The present invention relates to image processing units for processing input images or image sensing apparatuses equipped with the image processing unit.

What is claimed is:

1. An image sensing apparatus comprising:
an image generating portion which performs image sensing so as to generate an input image in which different regions have different exposure timings;
a movement detection portion which detects a movement of the image sensing apparatus when the image generating portion performs the image sensing;
a distortion calculation portion which calculates a distortion in the input image based on the movement detected by the movement detection portion;
a distortion correction processing portion which performs correction of the distortion calculated by the distortion calculation portion on the input image so as to generate an output image; and
a camera shake correction portion which performs a camera shake correction process for correcting a positional displacement when the image generating portion performs the image sensing sequentially,
wherein
the distortion correction processing portion controls the degree of the correction of the distortion based on a situation in which the input image is generated, and
the distortion correction processing portion further sets the degree of the correction of the distortion for the input image that is generated without the camera shake correction process to a smaller value than the degree of the correction of the distortion for the input image that is generated with the camera shake correction process, and otherwise the correction of the distortion is not performed for the input image that is generated without the camera shake correction process.

2. The image sensing apparatus according to claim 1, wherein the distortion correction processing portion does not perform the correction of the distortion for the input image that is generated by a fixed image sensing apparatus.

3. The image sensing apparatus according to claim 1, wherein the distortion correction processing portion sets the degree of the correction of the distortion to a smaller value for the input image having lower reliability of the detection result of the movement detected by the movement detection portion.

4. The image sensing apparatus according to claim 1, wherein the distortion correction processing portion sets the degree of the correction of the distortion to a smaller value for the input image having a smaller zoom magnification when the image generating portion performs the image sensing.

5. An image sensing apparatus comprising:
an image generating portion which performs image sensing so as to generate an input image in which different regions have different exposure timings;
a movement detection portion which detects a movement of the image sensing apparatus when the image generating portion performs the image sensing;
a distortion calculation portion which calculates a distortion in the input image based on the movement detected by the movement detection portion; and
a distortion correction processing portion which performs correction of the distortion calculated by the distortion calculation portion on the input image so as to generate an output image;
wherein
the distortion correction processing portion controls the degree of the correction of the distortion based on a situation in which the input image is generated, and
the distortion correction processing portion sets the degree of the correction of the distortion for the input image in which the movement detection portion detects a continuous movement in the same direction to a smaller value than the degree of the correction of the distortion for the input image in which a continuous movement in the same direction is not detected, and otherwise the correction of the distortion is not performed for the input image in which a continuous movement in the same direction is detected.

6. The image sensing apparatus according to claim 5, wherein the distortion correction processing portion does not perform the correction of the distortion for the input image that is generated by a fixed image sensing apparatus.

7. The image sensing apparatus according to claim 5, wherein the distortion correction processing portion sets the degree of the correction of the distortion to a smaller value for the input image having lower reliability of the detection result of the movement detected by the movement detection portion.

8. The image sensing apparatus according to claim 5, wherein the distortion correction processing portion sets the degree of the correction of the distortion to a smaller value for the input image having a smaller zoom magnification when the image generating portion performs the image sensing.

* * * * *